United States Patent
Matthews et al.

(10) Patent No.: US 7,801,919 B1
(45) Date of Patent: Sep. 21, 2010

(54) METHOD AND SYSTEM FOR PROVIDING DATABASE MANAGEMENT SYSTEM TOOLS

(75) Inventors: Patricia Ann Matthews, Atlanta, GA (US); Roney Bell, Phenix City, AL (US); Andrew Corbel Kao, Canton, GA (US); Frank Robinson, Jr., Atlanta, GA (US)

(73) Assignee: Total System Services, Inc., Columbus, GA (US)

( * ) Notice: Subject to any disclaimer, the term of this patent is extended or adjusted under 35 U.S.C. 154(b) by 563 days.

(21) Appl. No.: 11/788,965

(22) Filed: Apr. 23, 2007

Related U.S. Application Data

(60) Provisional application No. 60/793,886, filed on Apr. 21, 2006.

(51) Int. Cl.
G06F 17/30 (2006.01)

(52) U.S. Cl. .................. 707/790; 717/102; 717/115; 707/792

(58) Field of Classification Search ............. 707/103 R; 715/764; 717/102, 115
See application file for complete search history.

(56) References Cited

U.S. PATENT DOCUMENTS

| | | | | |
|---|---|---|---|---|
| 6,065,002 A | * | 5/2000 | Knotts et al. ................... | 1/1 |
| 6,141,660 A | * | 10/2000 | Bach et al. ............... | 707/103 R |
| 6,430,571 B1 | * | 8/2002 | Doan et al. ............. | 707/103 R |
| 6,449,624 B1 | * | 9/2002 | Hammack et al. ................... | 1/1 |
| 6,601,233 B1 | * | 7/2003 | Underwood ................ | 717/102 |
| 6,990,636 B2 | * | 1/2006 | Beauchamp et al. ......... | 715/764 |
| 7,069,547 B2 | * | 6/2006 | Glaser ......................... | 717/154 |
| 7,506,040 B1 | * | 3/2009 | Rabe et al. ................... | 709/223 |
| 2002/0107902 A1 | * | 8/2002 | Smith .......................... | 709/102 |
| 2005/0010693 A1 | * | 1/2005 | Sinclair et al. .............. | 709/250 |
| 2005/0131677 A1 | * | 6/2005 | Assadollahi ................. | 704/201 |
| 2005/0149418 A1 | * | 7/2005 | Erbey et al. .................... | 705/35 |
| 2006/0190522 A1 | * | 8/2006 | Nagata ........................ | 709/201 |
| 2006/0206870 A1 | * | 9/2006 | Moulden et al. ............. | 717/124 |
| 2007/0203925 A1 | * | 8/2007 | Sandler et al. .............. | 707/100 |
| 2008/0295092 A1 | * | 11/2008 | Tan et al. ..................... | 717/178 |

* cited by examiner

Primary Examiner—Don Wong
Assistant Examiner—Hanh B Thai
(74) Attorney, Agent, or Firm—King & Spalding

(57) ABSTRACT

Providing a centralized process for accessing and implementing database management tools. These tools may be either developed by a vendor of the database management system, a third party, or by the enterprise implementing the database management tools. The system would include an interface between the user and the system that allows the user to indicate specific tasks to perform and provide a means for the user to receive and input information. The interface may support the development of specific job control messages that can be executed to implement a chosen task.

6 Claims, 19 Drawing Sheets

```
LIBRARY     DBS.T10I.S8.WORK.DBDSRC              Row 00001 of 00089   630
Command ===>                                     Scroll ===> CSR
   Name     Prompt   Size  Created     Changed              ID
   DBDAE81            570  1997/10/01  2004/05/04 20:37:03  GP4FK1
   DBDAF81            463  1997/10/01  2004/03/24 16:36:31  GP4PAE
   DBDAM81           2254  1997/10/01  2004/03/24 15:45:19  GP4CJJ
   DBDAM82           2070  1997/10/01  2004/03/24 15:25:27  GP4CJJ
   DBDAP81            440  1997/10/01  2004/03/23 08:19:00  GP4CJJ
   DBDAS81            521  2003/10/01  2004/03/24 16:48:14  GP4PAE
   DBDAU81           2070  2001/01/10  2004/03/24 15:58:02  GP4PAE
   DBDAU82           2069  2001/01/22  2004/03/24 15:48:06  GP4PAE
   DBDAU83           1983  2001/01/10  2004/03/24 15:39:29  GP4PAE
   DBDAU84           1983  2001/01/10  2004/03/24 15:28:00  GP4PAE
   DBDAU85           2000  1999/02/26  2004/03/24 15:17:08  GP4PAE
   DBDAX81            459  2003/11/11  2004/03/24 15:57:09  GP4CJJ
   DBDBC81            474  2003/09/26  2004/03/23 12:10:21  GP4CJJ
   DBDBI82           2047  2001/02/15  2004/03/24 17:00:48  GP4CJJ
   DBDBI83           2040  2001/02/15  2004/03/25 00:12:11  GP4CJJ
   DBDBM81            482  1997/10/01  2004/03/24 16:45:32  GP4JAF
   DBDCB81            469  1997/10/01  2004/03/24 14:50:47  GP4PAE
   DBDCC81            424  2000/09/28  2004/03/24 16:28:00  GP4JAF
```

Fig. 6f

------- TUTORIAL FOR DBA'S COMMANDS / IMSTOOLS / DBA TIPS -------

COMMAND / SELECT OPTION ===> 1

THE FOLLOWING IS A LIST OF AVAILABLE COMMANDS AVAILABLE FOR DBA USE.
TO VIEW THE TUTORIAL FOR THE COMMANDS, ENTER THE APPROPRIATE NUMBER
ON THE COMMAND LINE AND PRESS THE ENTER KEY

| | |
|---|---|
| 1. ADDAREA | 9. FORMATDB |
| 2. AREADEF | 10. FTCMDS |
| 3. AREASIZE | 11. RANDTAB |
| 4. CLNTSIZE | 12. SYNC |
| 5. COPYAREA | 13. IDCAMS |
| 6. DROPAREA | 14. IMSTOOLS |
| 7. DROPPCB | 15. DBA TIPS |
| 8. PFXINFO | |

SPECIAL NOTES:

1. FOR COLOR DISPLAYS, REQUIRED PARMS ARE YELLOW, OPTIONAL PARMS ARE GREEN.
2. PRESS "F3" KEY OR ENTER "END" TO RETURN TO PREVIOUS MENU.
3. ENTER "X" ON COMMAND LINE AND PRESS ENTER KEY TO RETURN TO MAIN MENU.

Fig. 8a

METHOD AND SYSTEM FOR PROVIDING DATABASE MANAGEMENT SYSTEM TOOLS

STATEMENT OF RELATED PATENT APPLICATIONS

This non-provisional patent application claims priority under 35 U.S.C. §119 to U.S. Provisional Patent Application No. 60/793,886, titled System for Providing Information Management System Tools, filed Apr. 21, 2006. This provisional application is hereby fully incorporated herein by reference.

FIELD OF THE INVENTION

This invention relates to a system and method for providing database management tools. More particularly, this invention relates to processes and systems that provide centrally-located tools to perform routine management tasks for databases.

BACKGROUND OF THE INVENTION

Almost every enterprise today, such as a large corporation, uses one or more database systems to store and manipulate information. These database systems often comprise both a database, which is a collection of interrelated data items, stored once and organized in a form for easy retrieval, and a database management system, which is a collection of programs for storing, organizing, selecting, modifying, and extracting data from a database. A few examples of databases and database management systems are IBM's IMS and DB2, ORACLE, MICROSOFT ACCESS, and MYSQL.

Databases can be structured differently. For example, IBM's IMS is a hierarchal database. In a hierarchal database, data is organized in a tree-like structure, with parent-child relationships between data items. Another type of structure is a relational database. In a relational database, data items are arranged in a series of tables, where relationships between data items are expressed based on the attributes of the data item. Other database structures include object-oriented databases, flat file databases, deductive databases, dimensional databases, temporal databases, and extensible mark-up language (XML) data stores.

Regardless of the structure of a database, database management systems are used to store, organize, select, extract, and modify the data. Some database programs, such as IBM's IMS system includes programs that can be used to manage the database. These tools are often updated or modified by the database system vendor, a third-party vendor, or other programmer. Additionally, an enterprise may have specific, repetitive tasks that it performs with a database. For example, an enterprise may routinely manipulate data based on specific clients or product lines. These manipulations may be captured in enterprise-specific utilities, often written by or for the enterprise, that can be used to automatically manipulate the data without repeating certain steps. The programs, or database management system tools, are processes or tasks that can be implemented to maintain a database system or otherwise support database management system operations.

Databases and database management systems reside on one or more computer platforms within an enterprise. Instructions for managing data must be written in the specific computer language for the host platform. For example, an IBM IMS system resident on an IBM mainframe computer would receive instructions in Job Control Language (JCL) to run batch data management processes. Typically, these instructions are not written in English, that is, these instructions are not written in the normal syntax of a written or spoken sentence. Instead, these instructions have a defined syntax, dependent on the language being used. For example, JCL requires an 80-byte record with information on a single line. The information includes an identifier field, a name field, an operation field, an operand field, and a comment field.

Typically today, multiple versions of the tools, or programs, used by database management systems exist. For example, different utilities and JCL scripts exist for IMS database management for maintaining and supporting IBM's IMS databases. However, because multiple versions of the tools exist and multiple people are modifying each version, enterprises have difficulty keeping these multiple versions in sync. Also, no single set of tools exists to meet the majority of IMS management requirements. Also, although utility software required to maintain databases, such as IMS databases, may have been upgraded and JCL scripts may have been modified, other database management tools may not have been updated in response. As such, incompatibility issues increase.

What is needed is a system and method for providing a single set of updated tools, located in a central location to a enterprise, that can be used to manage databases, such as IBM's IMS databases.

SUMMARY OF THE INVENTION

The present invention supports systems and methods for providing database management tools through a centralized process. These tools may be either developed by a vendor of the database management system, a third party, or by the enterprise implementing the database management tools. The system would include an interface between the user and the system that allows the user to indicate specific tasks to perform and provide a means for the user to receive and input information. The interface may support the development of specific job control messages that can be executed to implement a chosen task.

In one aspect of the present invention, a system for providing database management system tools is provided. This system includes a database system resident on one or more computer platforms of an enterprise, a plurality of database management tools operable to manipulate data contained in the database system, where the database management tools comprise at least one tool developed specifically for the database system and the enterprise; and a dialog management module, logically connected to the plurality of database management tools and operable to provide a single interface for accessing and implementing the plurality of database management tools.

In another aspect of the present invention, a method for developing a centralized database management system for an enterprise is provided. This method includes the steps of: identifying a first database management tool specific to a database management system; identifying a second database management tool specific to the database system and the enterprise, where the second database management tool comprises a tool developed for the enterprise based on a specific use of the database management system; developing a job control library; and developing an interface for each of the identified tools, where the interface provides a central access point to the first database management tool and the second database management tool for a user.

In yet another aspect of the present invention, a method for accessing a centralized database management system for an enterprise is provided. This method includes the steps of:

presenting a dialog screen to a user, where the dialog screen provides access to a plurality of database management tasks; receiving from the user an indication of a selected database management task; presenting one or more dialog screens associated with the selected database management task; and receiving one or more data items from the user, where the user inputs the one or more data items into the dialog screens.

BRIEF DESCRIPTION OF THE DRAWINGS

FIG. 6f presents a screen image depicting a dataset maintenance screen in accordance with an exemplary embodiment of the present invention.

FIG. 8a presents a screen image depicting a tutorial screen in accordance with an exemplary embodiment of the present invention.

DETAILED DESCRIPTION OF THE EXEMPLARY EMBODIMENTS

Exemplary embodiments of the present invention are provided. These embodiments include systems and methods for providing and using a centralized set of tools to manage a database, such as an IBM IMS database. Although this detailed description focuses on IBM's IMS database system, one of ordinary skill in the art would appreciate that these methods and systems can apply to other database systems.

Figure 1:
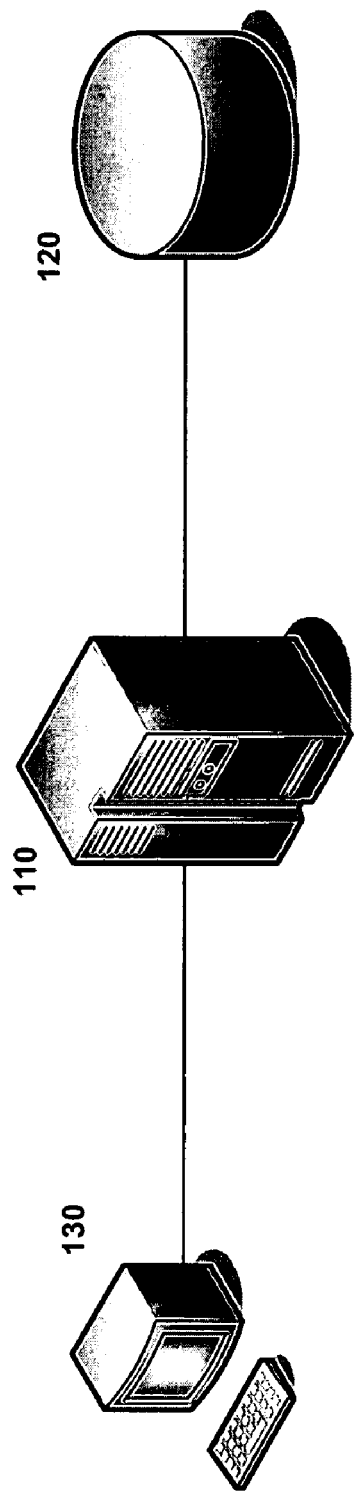
FIG. 1 depicts an operating environment in accordance with an exemplary embodiment of the present invention.

FIG. 1 depicts an operating environment 100 in accordance with an exemplary embodiment of the present invention. Referring to FIG. 1, a database and management system, such as an IBM IMS database management system, resides on a mainframe computer 110. The data associated with the database resides in a data store 120, which is logically connected to the mainframe computer 110. The mainframe computer 110 may service a variety of programs including programs that use data from the database store 120. The mainframe computer 110 is accessed using a terminal, such as a terminal 130. The terminal 130 enables a user to provide input and instructions to programs resident on the mainframe computer 110 and enables the user to receive information from the mainframe computer 110.

One of ordinary skill in the art would understand that other computer platforms could host a database and database management system. For example, the database and database management system could reside on a network server (not shown) that is part of a local area or wide area network. Similarly, the database management system may reside on a single computer, such as mainframe computer 110, and the database reside in distributed data stores (not shown), including data stores on different computer platforms. Also, the mainframe computer 110 or other host computer could be accessed by a variety of hardware other than terminal 130, such as a personal computer (not shown) running terminal emulation software. Indeed, one of ordinary skill in the art would understand that a variety of computer systems may be used, provided that a user has access to the necessary database management tools and can manage the data stores using those tools.

Figure 2:
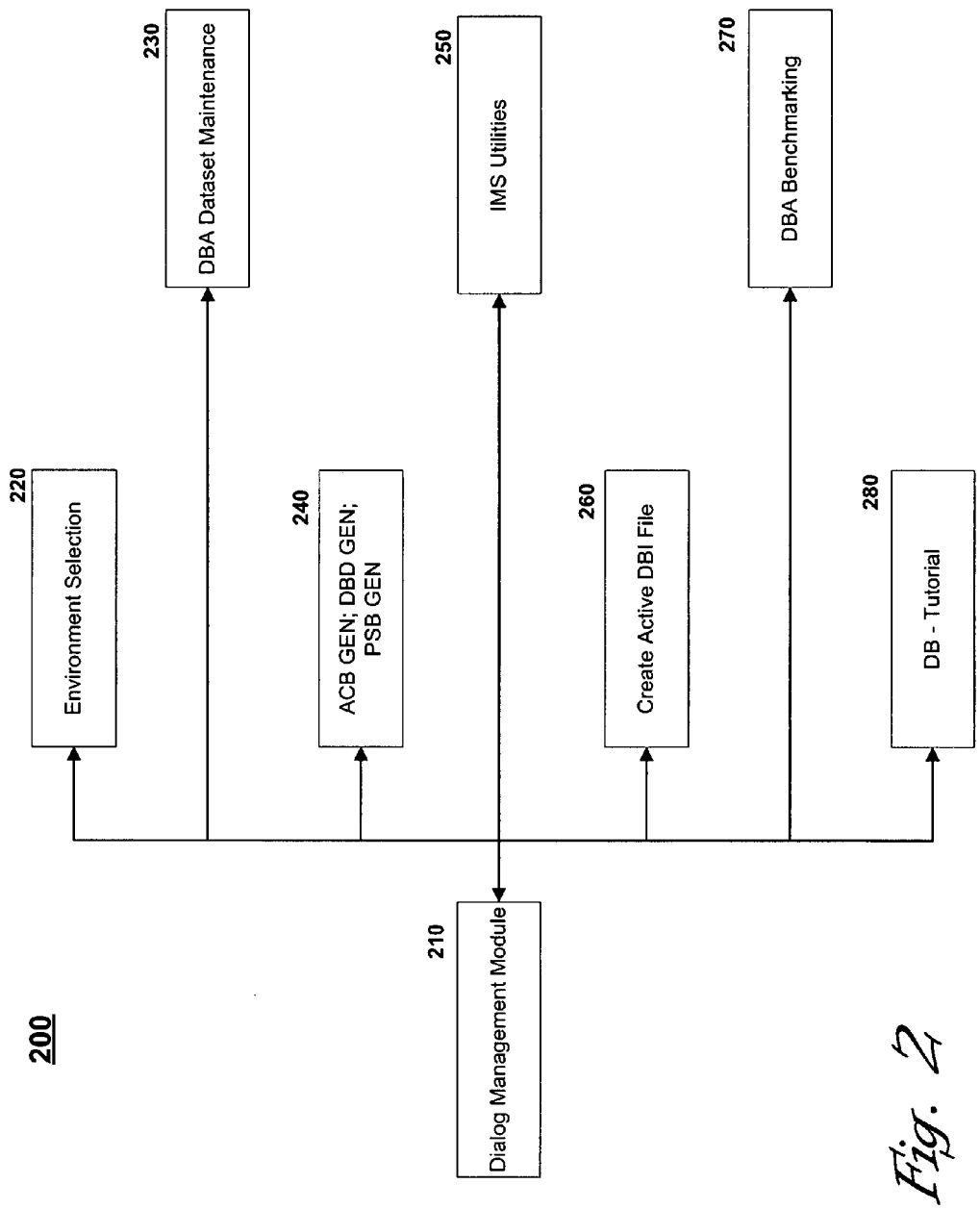
FIG. 2 depicts a software architecture in accordance with an exemplary embodiment of the present invention.

FIG. 2 depicts a software architecture 200 in accordance with an exemplary embodiment of the present invention. Referring to FIGS. 1 and 2, a dialog management module 210 provides an interface between database management tools and a user, such as a user using terminal 130. This interface allows the user to provide information to the system necessary to implement a specific database management task. For example, the dialog management module 210 may be developed using the interactive system productivity facility (ISPF) dialog manager, which is a part of the operating system of an IBM mainframe computer, such as mainframe computer 110. The ISPF dialog manager provides different kinds of services to dialogs while they are running and also controls the interaction of the dialog's elements. For example, ISPF can issue requests for panels to be displayed or screens to be formatted. These screens would be tailored to support the required operation, such as database management. Examples of such screens are discussed in detail below, in association with FIGS. 6a-8d.

In this exemplary embodiment, the dialog management module 210 provides dialog elements for each sub-category of database management tools. These subcategories include Environmental Selection 220, Database Administrators (DBA) Dataset Maintenance 230, Application Control Block (ACB) Generation/Database Definition (DBD) Generation/ Program Specification Block (PSB) Generation 240, IMS Utilities 250, Create Active Database Information File (DBI) 260, DBA Benchmarking 270, and Database (DB) Tutorial 280. Through the panels, or screens, presented to a user, such as a user at terminal 130, the dialog management module 210 provides the necessary interaction between the user and the database management tools. As such, the dialog management module 210 provides the user with access, in a centralized location, to the tools.

Figure 3:
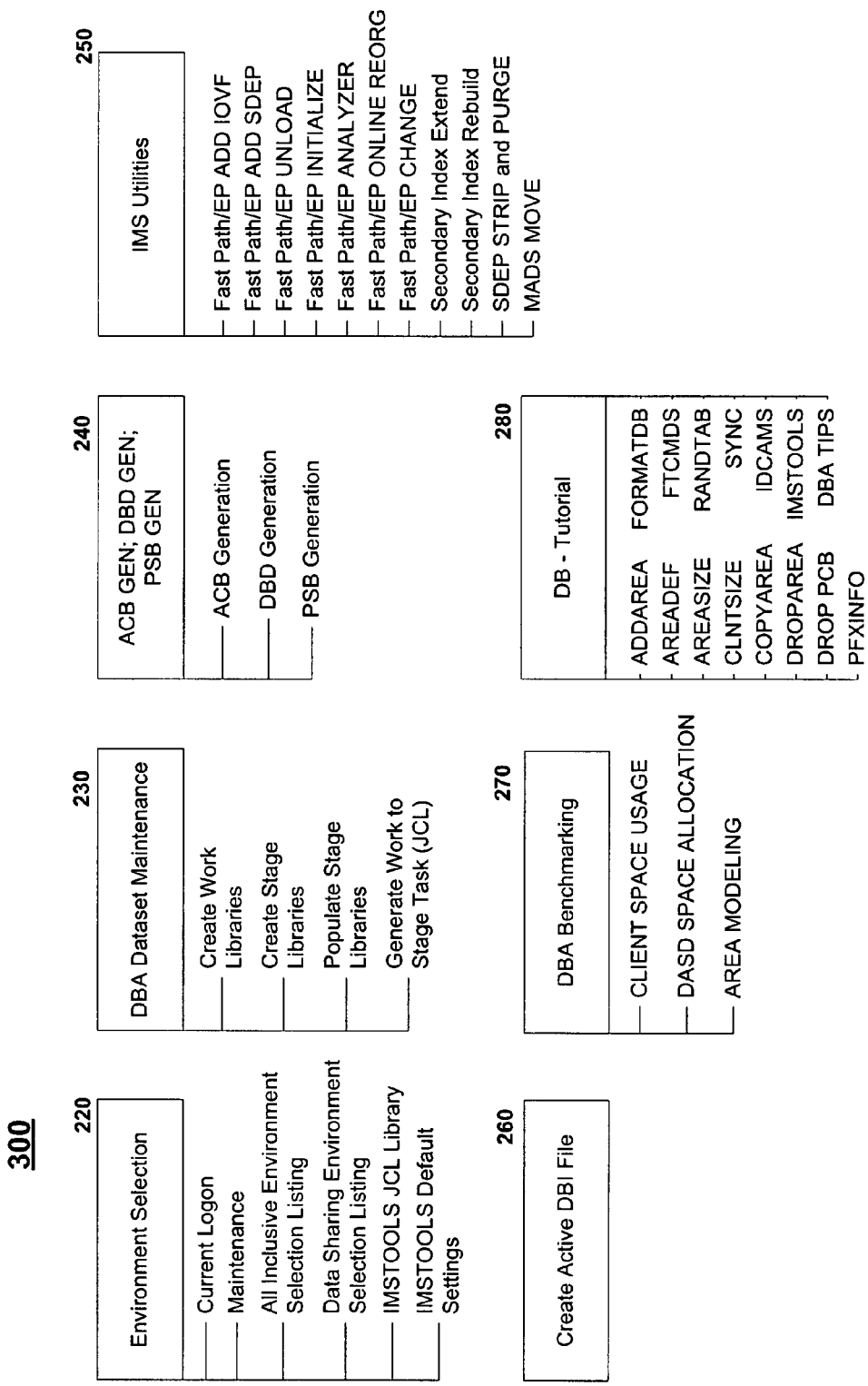
FIG. 3 depicts a software architecture in accordance with an exemplary embodiment of the present invention.

FIG. 3 depicts a software architecture 300 in accordance with an exemplary embodiment of the present invention. Referring to FIGS. 1, 2, and 3, the architecture 300 depicts the relationship of individual subcategories of database management tools and specific tasks within those subcategories. For example, the Environmental Selection subcategory 220 includes tasks such as "Current Logon"; "Maintenance"; "All Inclusive Environment Selection Listing"; "Data Sharing Environment Selection Listing"; "IMSTOOLS JCL Library"; and "IMSTOOLS Default Settings." These tasks represent specific activities that a user may select to implement as part of a database management process. For example, the dialog management module 210 may present a panel, or screen, to a user at terminal 130 that allows that user to select activities associated with the subcategory Environment Selection 220. Examples of screens are discussed in detail below, in conjunction with FIGS. 6a-8d.

In this exemplary embodiment, the DBA Dataset Maintenance subcategory 230 allows for the creation and maintenance of datasets used by DBAs to maintain and support databases, such as IMS databases. Also, this option allows a user to create JCL used during implementation of DBA modifications to the databases. This aspect is discussed in greater detail below, in conjunction with FIG. 5. The exemplary tasks for DBA Dataset Maintenance subcategory 230 include "Create Work Libraries"; "Create Stage Libraries"; "Populate Stage Libraries"; and "Generate Work to Stage Task (JCL)."

Similarly, the ACB Generation/DBD Generation/PSB Generation subcategory 240 generates IMS control blocks used by IMS Data Base Management System to define the databases and access to them. While these control blocks are specific to an IMS system, one of ordinary skill in the art would appreciate that other database management system control processes could be substituted. The ACB Generation/DBD Generation/PSB Generation subcategory 240 includes exemplary tasks "ACB Generation"; "DBD Generation"; and "PSB Generation."

The IMS Utilities subcategory 250 creates JCL used to execute software utilities required to maintain and implement IMS DBA tasks, specifically for "FAST PATH" IMS systems. Again, one of ordinary skill in the art would appreciate that other database system utilities could be substituted. The IMS Utilities subcategory 250 tasks include "Fast Path/EP ADD IOVF"; "Fast Path/EP ADD SDEP"; "Fast Path/EP UNLOAD"; "Fast Path/EP RELOAD"; "Fast Path/EP INITIALIZE"; "Fast Path/EP ANALYZER"; "Fast Path/EP ONLINE REORG"; "Fast Path/EP CHANGE"; "Secondary Index Extend (FAST PATH ONLY)"; "Secondary Index Rebuild (FAST PATH ONLY)"; "SDEP [Sequential Dependents] STRIP and PURGE"; and "MADS [Multiple Area Data Sets] MOVE."

The Create Active DBI File subcategory 260 creates JCL used to define a data base information file used by an enterprise-specific software and is an example of a unique tool to a specific database system and application. One of ordinary skill in the art would appreciate that any subcategories and tasks that are specific to the enterprise's data manipulation needs can be added to the suite of tools used for database management and these tools can be accessed through the dialog management module 210.

The DBA Benchmarking subcategory 270 displays Direct Access Storage Device (DASD) space used to define databases and Fast Path area sizing estimates based on data estimates provided. This task may be used by the DBA to simulate the affects of a change to the sizing of a data area. The DBA Benchmarking subcategory 270 includes the following tasks: "CLIENT SPACE USAGE"; "DASD SPACE ALLOCATION"; and "AREA MODELING."

The DB-Tutorial subcategory 280 displays definitions of DBA commands, IMSTOOLS information, and helpful DBA tips. The DB-Tutorial subcategory 280 items that a user may select include: "ADDAREA"; "AREADEF"; "AREASIZE"; "CLNTSIZE"; "COPYAREA"; "DROPAREA"; "DROPPCB"; "PFXINFO"; "FORMATDB"; "FTCMDS"; "RANDTAB"; "SYNC"; "IDCAMS"; "IMSTOOLS"; and "DBA TIPS." Of course, additional or different concepts may be added to the tutorial feature as needed. The tutorial task provides the user with information about each listed task.

Figure 4:
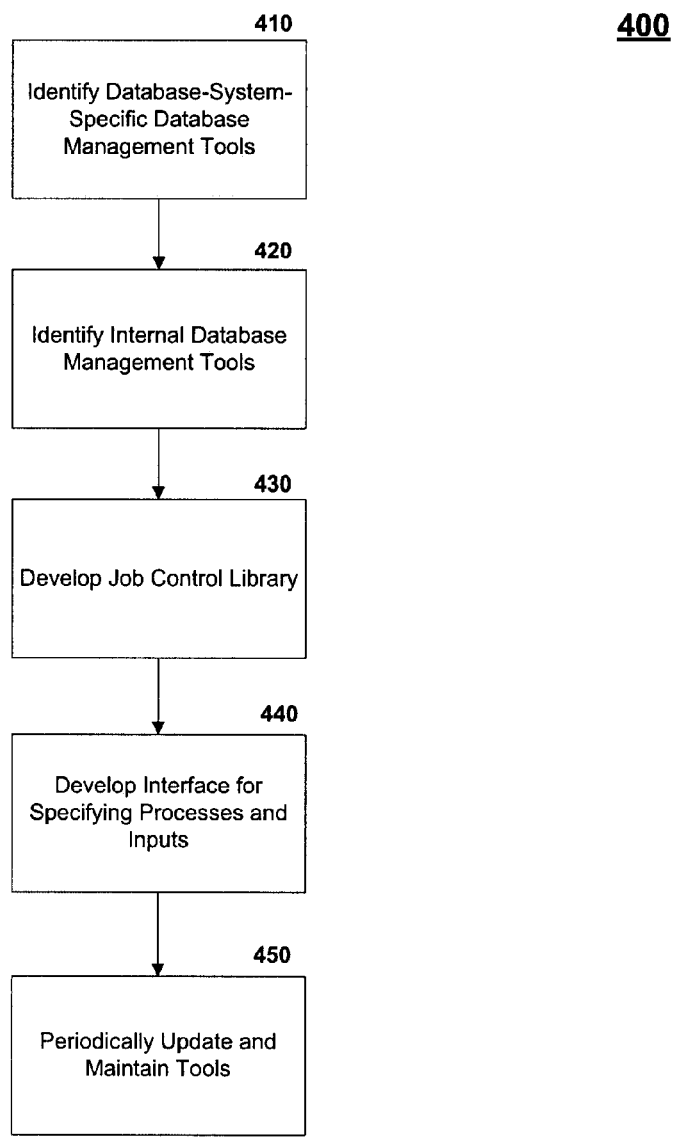
FIG. 4 depicts an overall process flow for developing a centralized system of database management tools in accordance with an exemplary embodiment of the present invention.

FIG. 4 depicts an overall process flow 400 for developing a centralized system of database management tools in accordance with an exemplary embodiment of the present invention. Referring to FIGS. 2 and 4, at step 410, a database management tools developer identifies database-system-specific database management tools. Typically, commercially-available database systems and database management systems will have certain utilities and other tools that support database management process. This identification step requires the database management tools developer to identify where the tools are located, that is, on what computer platforms and what directories are the tools stored. This identification step also requires the database management tools developer to identify the information needs for the specific tools. For example, a tool may require a user to specify specific database files that the tool will act upon or parameters that will govern the actions.

At step 420, a database management tools developer identifies internal database management tools. Typically, an enterprise would develop specific, internal tools that perform discrete tasks that are routinely done as part of database management for that enterprise. In this way, these tasks are "automated" by having a tool set that enables a user, such as a DBA, to efficiently perform the tasks. This identification step requires the database management tools developer to identify where the internal tools are located, that is, on what computer platforms and what directories are the tools stored. This identification step also requires the database management tools developer to identify the information needs for the specific tools.

At step 430, the database management tools developer develops a job control library. Typically, database management systems, particularly systems that reside on mainframe computers, carry out batch processes through a series of job instructions. Different computer platforms will have different requirements. For example, an IBM mainframe implements batch processes through JCL instructions. At this step, the library that is developed will support the specific needs of the computer platform.

At step 440, the database management tools developer develops an interface for specifying processes and inputs, such as dialog management module 210. This interface may take advantage of a feature of the operating system of the computer platform, such as ISPF. This interface will display or otherwise present information to a user and accept data from the user to facilitate implementing a specific tool. Either the interface itself or the individual tool would be capable of building the job control file to implement the specific database management task.

At step 450, the database management tools developer updates and maintains the tools and the interface. This step would be performed on an as-needed or routine basis.

Figure 5:
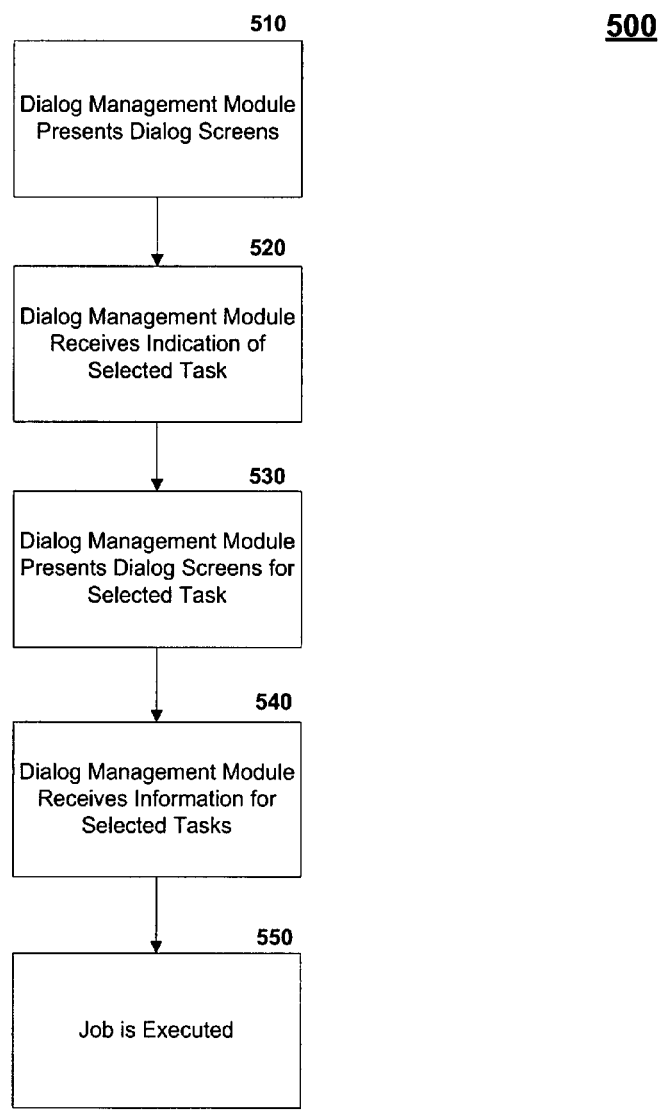
FIG. 5 depicts a overall process for implementing an individual tool from a centralized system of database management tools in accordance with an exemplary embodiment of the present invention.

FIG. 5 depicts a overall process flow 500 for implementing an individual tool from a centralized system of database management tools in accordance with an exemplary embodiment of the present invention. Referring to FIGS. 1, 2 and 5, at step 510, the dialog management module 210 presents a user, such as a user using terminal 130, a dialog screen. This dialog screen may be an initial, top level screen, or a screen in response to a previous selection of a menu item by a user. In this exemplary embodiment, the dialog screens would include a top level screen, which would allow the user to select options from a menu. These options may represent, at this top level, categories of tasks for database management. Alternatively, the dialog screen may list, in a menu form, tasks that could be performed. Each task may correspond to a specific database management tool. Other dialog screens may present the user specific information and ask for certain data to be entered.

At step 520, the dialog management module 210 receives an indication from the user of a selected task. This indication may be from entering an alphanumeric character corresponding to a task into the dialog screen. At step 530, dialog management module 210 presents one or more dialog screens associated with the selected task. The dialog screens may include scroll and page features to enable the user to navigate through the screens.

At step 540, the dialog management module 210 receives information from the user needed to implement a specific task. One of ordinary skill in the art would appreciate that this step depends on the selected task and that no information may be needed for some tasks. For example, the selected task may be a tutorial, where information is provided to the user, but the user does not provide any information to the dialog management module 210.

At step 550, a job is executed. This job may be the result of the interactive process of steps 510-540. Of course, some tasks will not require the execution of a job. The interactive process of steps 510-540 may result in the dialog management module 210 generating a job. The dialog management module 210, at step 550, would communicate to a user where the job is stored, so that the job can be executed. Alternatively, the dialog management module 210 could provide a means for the user to execute the job at that time.

Figure 6A:
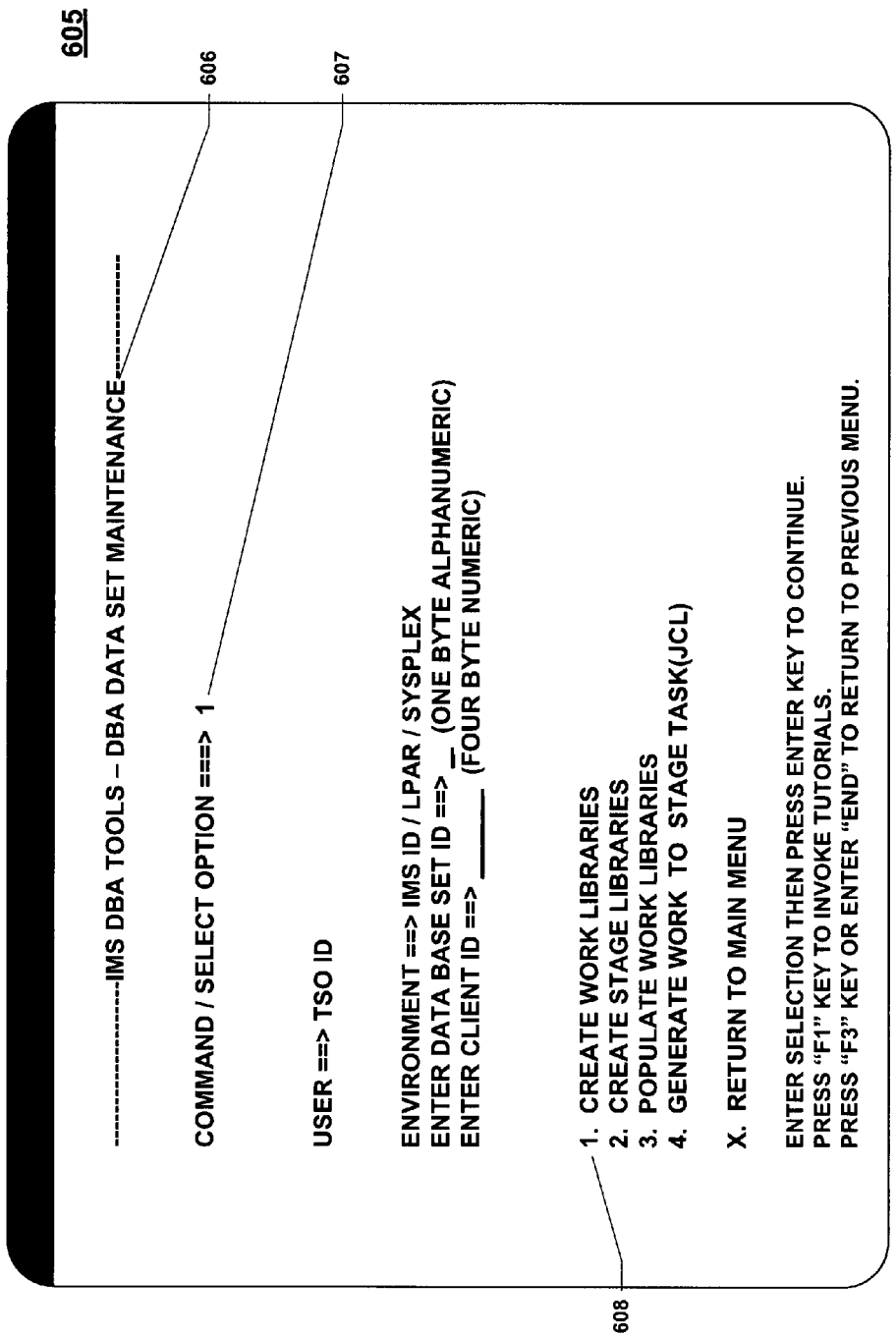
FIG. 6a presents a screen image depicting a dataset maintenance screen in accordance with an exemplary embodiment of the present invention.

FIG. 6a presents a screen image 605 depicting a dataset maintenance screen in accordance with an exemplary embodiment of the present invention. Referring to FIG. 6a, the item 606 displays the name of the task or category of tasks. In this example, the category of task is "DBA Data Set Maintenance," as seen in item 606. The dialog screen 605 allows a user to input a selection for a specific task. In this example, the alphanumeric value "1" is added at point 607. This entry corresponds to menu item "Create Work Libraries," seen at item 608.

Figure 6B:
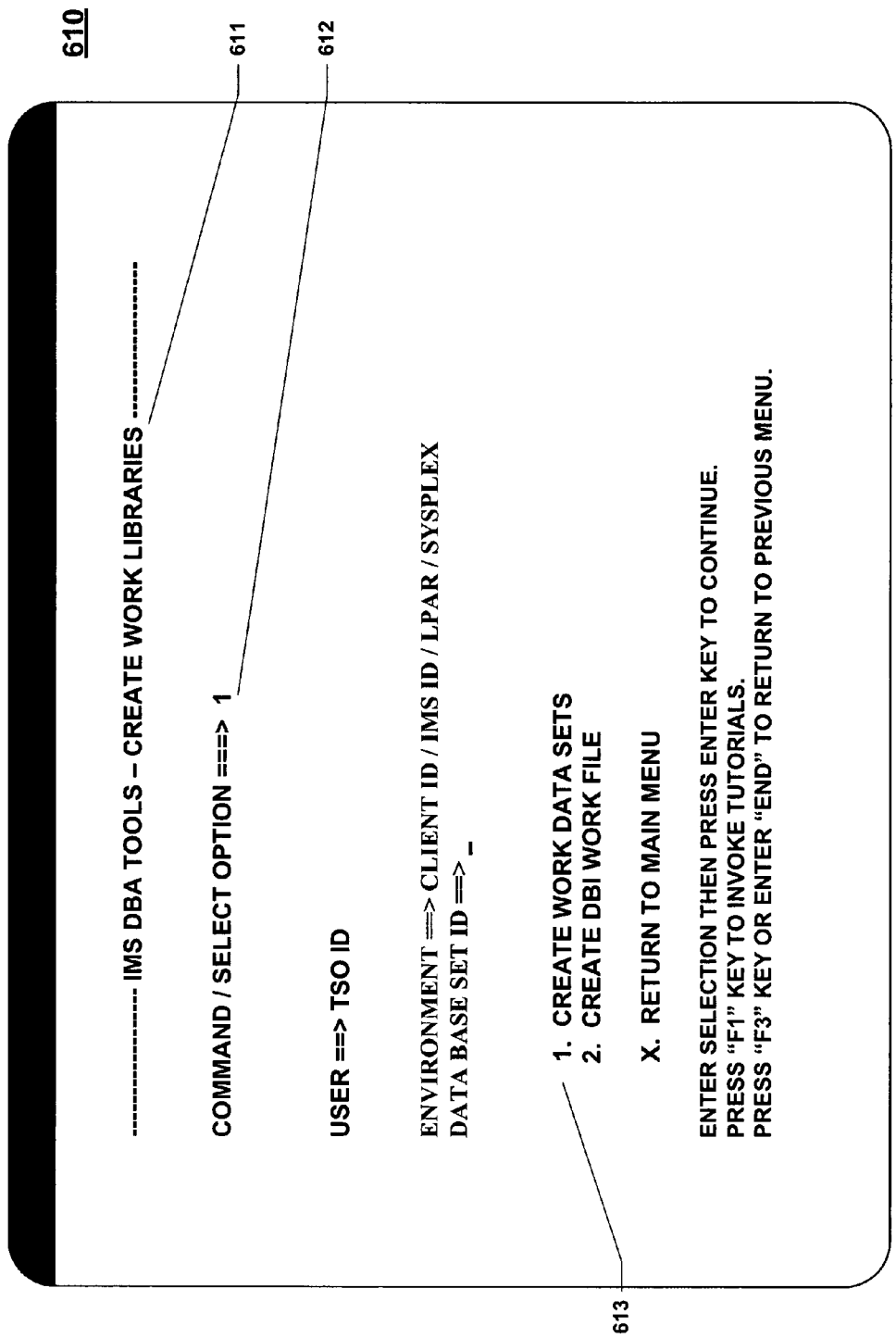
FIG. 6b presents a screen image depicting a dataset maintenance screen in accordance with an exemplary embodiment of the present invention.

FIG. 6b presents a screen image 610 depicting a dataset maintenance screen in accordance with an exemplary embodiment of the present invention. Referring to FIG. 6b, as item 611 indicates, this exemplary screen relates to the task of "Create Work Libraries," which was seen to be selected in the screen image 605 depicts at FIG. 6a. The dialog screen 610 allows a user to input a selection for a specific task. In this example, the alphanumeric value "1" is added at point 612. This entry corresponds to menu item "Create Work Libraries," seen at item 613.

Figure 6C:
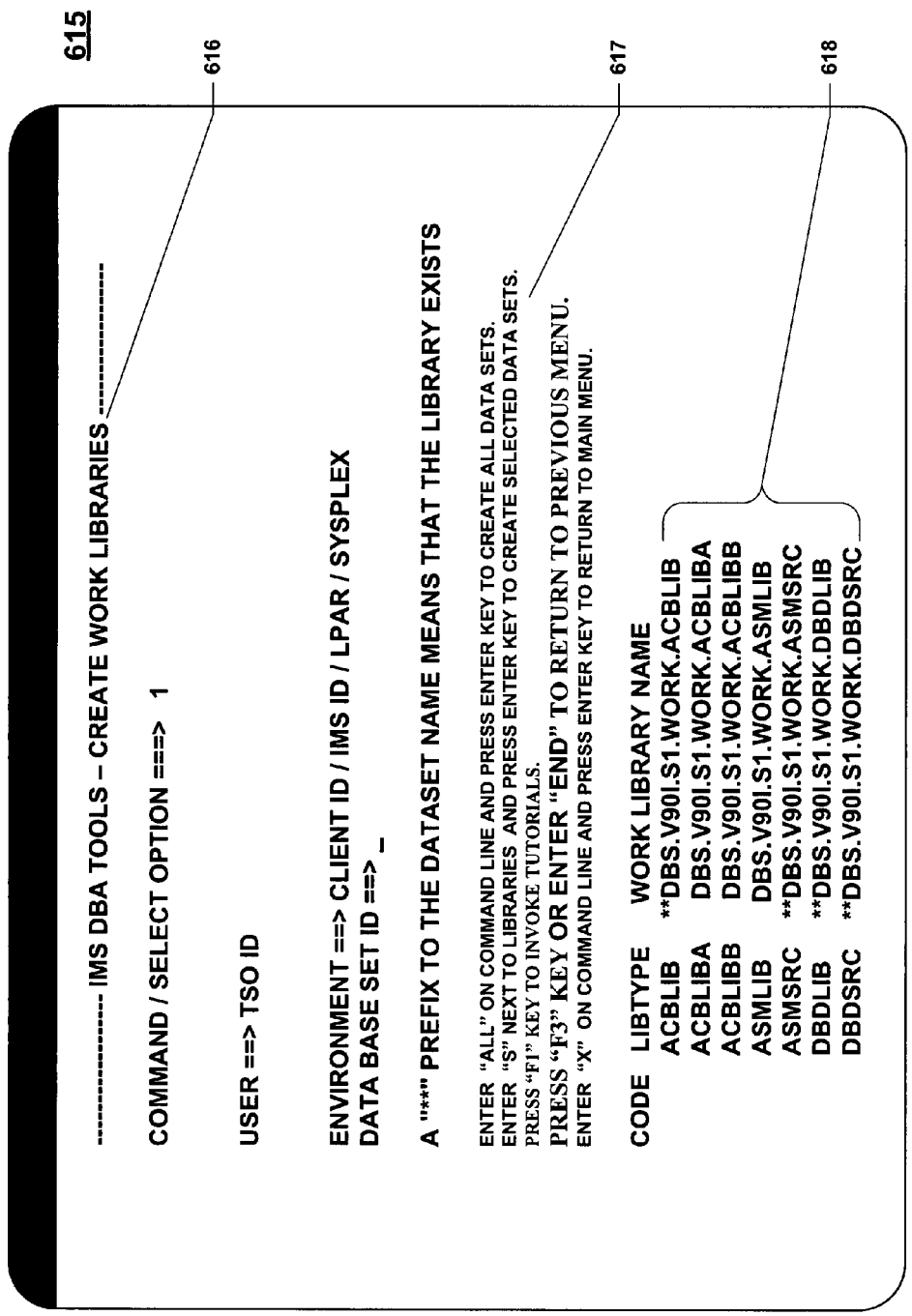
FIG. 6c presents a screen image depicting a dataset maintenance screen in accordance with an exemplary embodiment of the present invention.

FIG. 6c presents a screen image 615 depicting a dataset maintenance screen in accordance with an exemplary embodiment of the present invention. Referring to FIG. 6c, as item 616 indicates, this exemplary screen relates to the task of "Create Work Libraries," which was seen to be selected at FIG. 6a. The dialog screen 615 allows a user to input a selection for a specific task. As seen at item 617, the user may enter an "S" next to a listed library to create a data set. The item 618 shows a list of libraries.

Figure 6D:
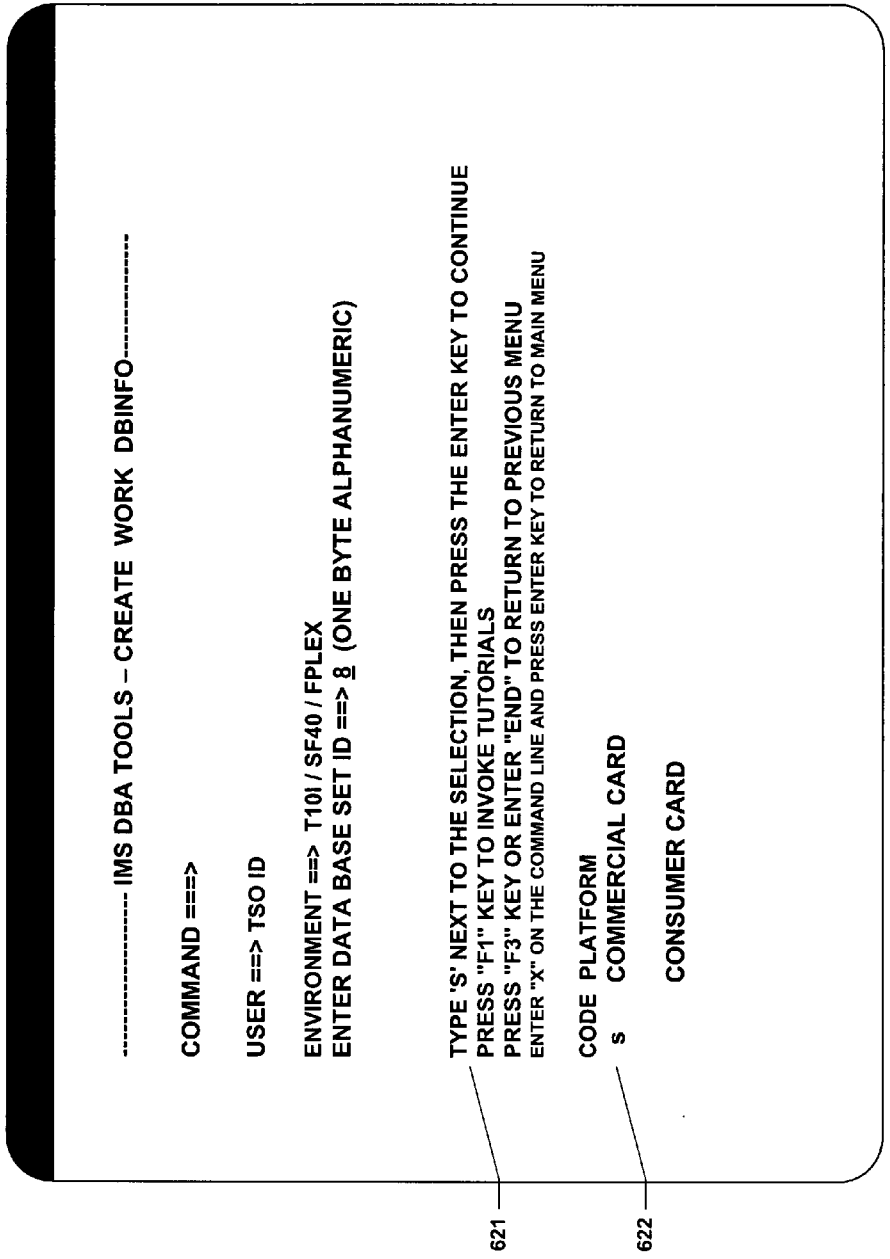
FIG. 6d presents a screen image depicting a dataset maintenance screen in accordance with an exemplary embodiment of the present invention.

FIG. 6d presents a screen image 620 depicting a dataset maintenance screen in accordance with an exemplary embodiment of the present invention. Referring to FIG. 6d, item 621 indicates, in a subsequent screen related to creating a data set, that the user can indicate, with an "S," the specific data platform for which this data set is to be created. Item 622 shows this indication, "COMMERCIAL CARD."

Figure 6E:
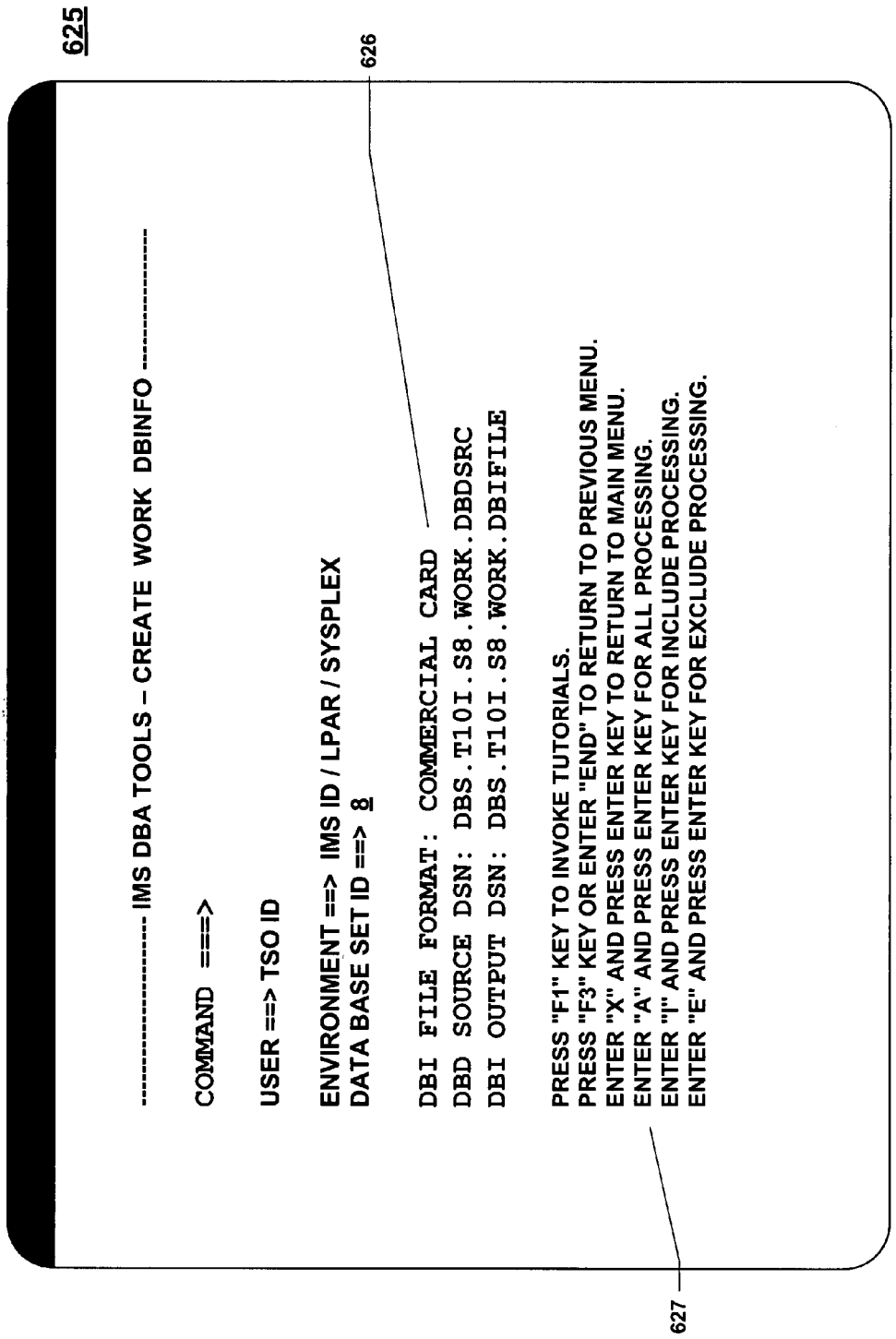
FIG. 6e presents a screen image depicting a dataset maintenance screen in accordance with an exemplary embodiment of the present invention.

FIG. 6e presents a screen image 625 depicting a dataset maintenance screen in accordance with an exemplary embodiment of the present invention. Referring to FIG. 6e, item 626 shows that the data set is being created for the "Commercial Card" platform, as indicated in the screen image 620 in FIG. 6d. This screen provides the user with additional choices. For example, item 627 shows that a user may provide the alphanumeric letter "A" to trigger the "All Processing" action.

FIG. 6f presents a screen image 630 depicting a dataset maintenance screen in accordance with an exemplary embodiment of the present invention. Referring to FIG. 6f, the screen image 630 depicts a listing of a database information file. Item 631 provides an indication of the file name: "DBS.T10I.S8.WORK.DBDSRC." Item 632 shows that a user may navigate, or scroll, to the cursor location (indicated by "CSR"), that is, the page scrolls down to a point where the cursor is at the top of the page. Item 633 shows a data set item, in this case a name of a data set. Item 634 shows that the file has 89 rows and that the top displayed row is row 1.

Figure 6G:
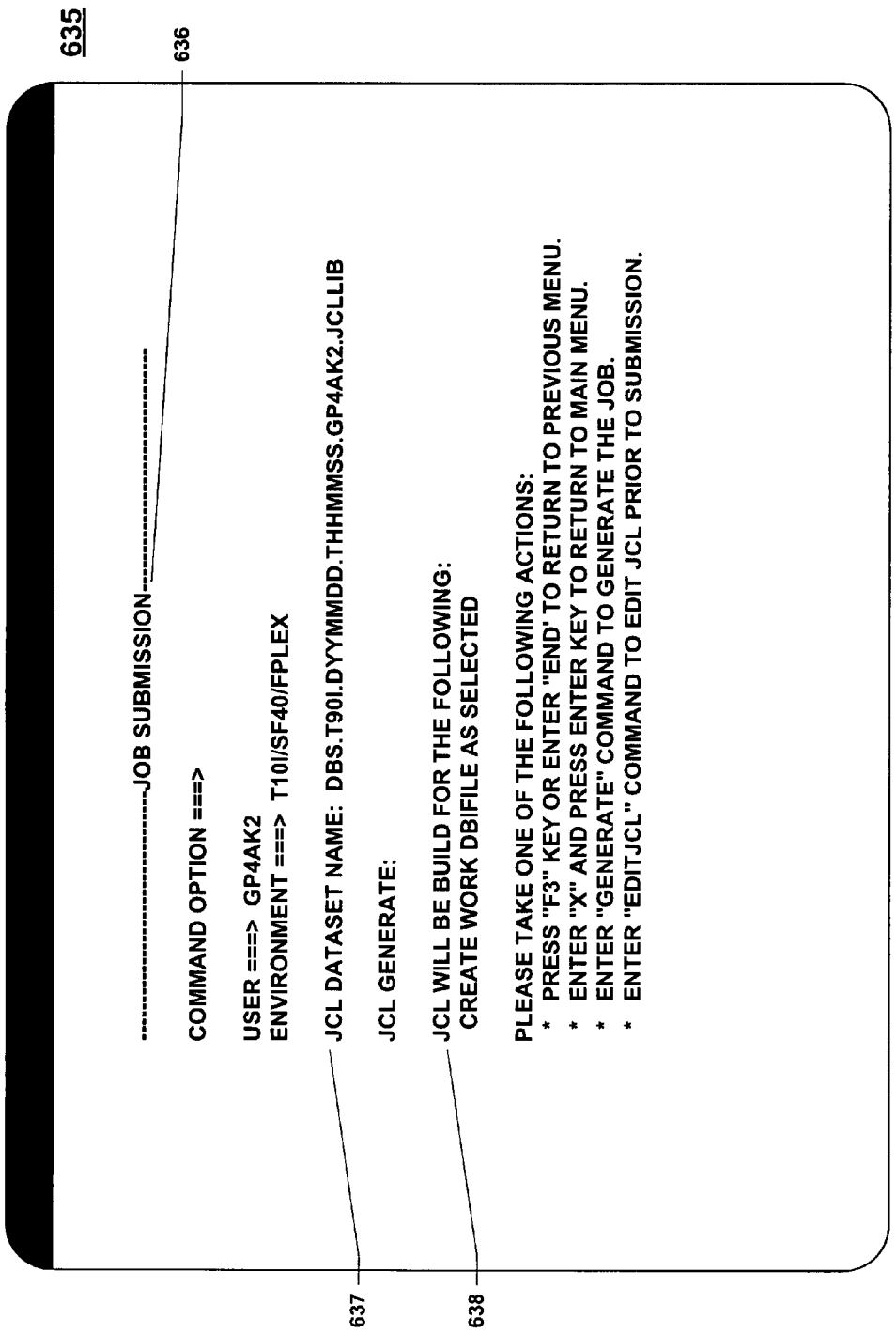
FIG. 6g presents a screen image depicting a dataset maintenance screen in accordance with an exemplary embodiment of the present invention.

FIG. 6g presents a screen image 635 depicting a dataset maintenance screen in accordance with an exemplary embodiment of the present invention. Referring to FIG. 6g, as indicated by item 636, this screen image is for submitting the data set job. In this case, as indicated by item 638, the job will create a work database information (DBI) file. Item 637 shows the JCL dataset name for this task.

Figure 7A:
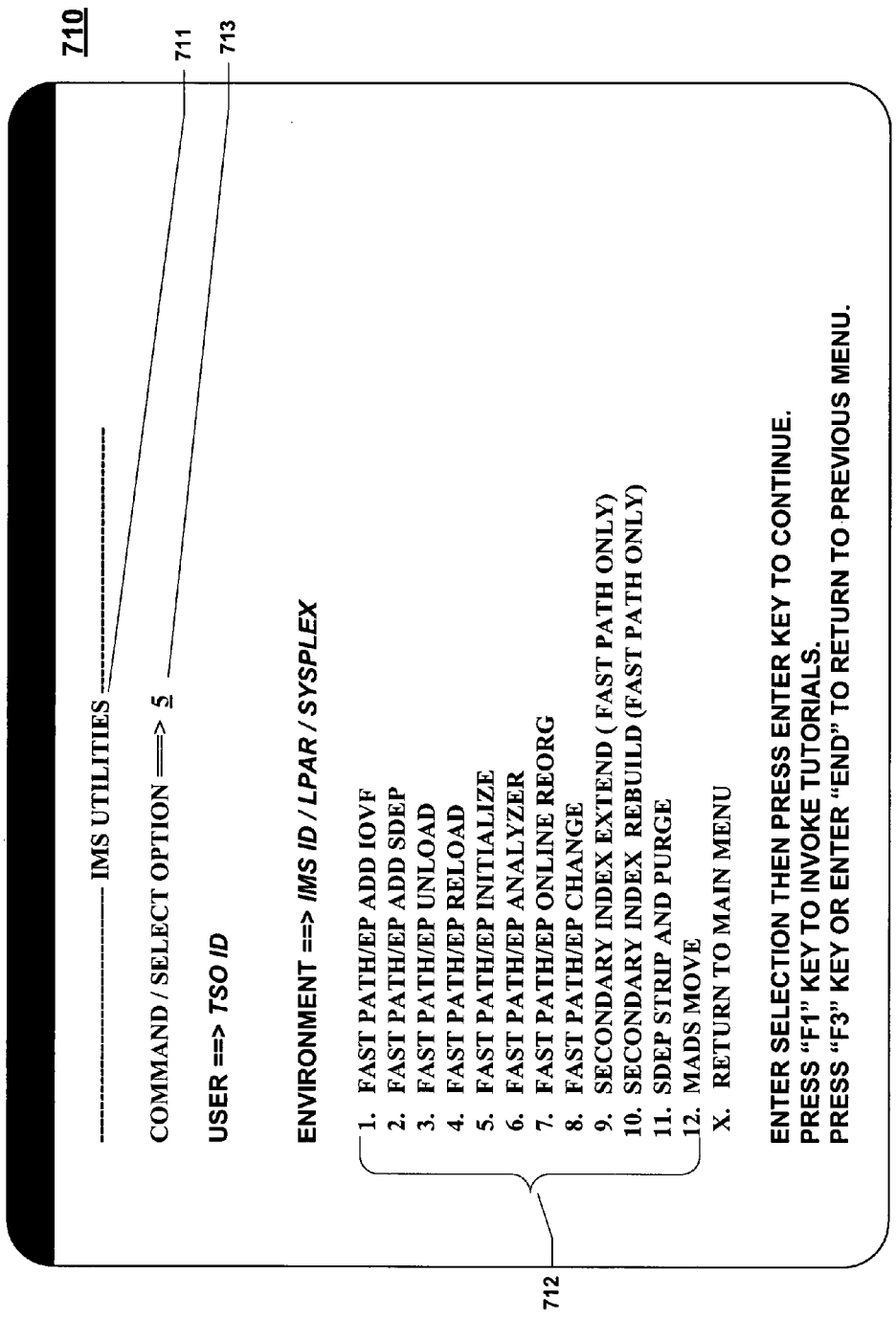
FIG. 7a presents a screen image depicting an IMS utilities screen in accordance with an exemplary embodiment of the present invention.

FIG. 7a presents a screen image 710 depicting an IMS utilities screen in accordance with an exemplary embodiment of the present invention. Referring to FIG. 7a, as seen at item 711, this screen lists IMS Utilities. Item 712 shows the list of options for the user. The user enters the number of the utility they want to implement into the command line show at item 713. A cursor, such as an underline, would be moved to the location indicated by item 713 to allow the user to enter the option number or other alphanumeric comment. In this case, option associated with number "5" has been selected—"FAST PATH/EP INITIALIZE."

Figure 7B:
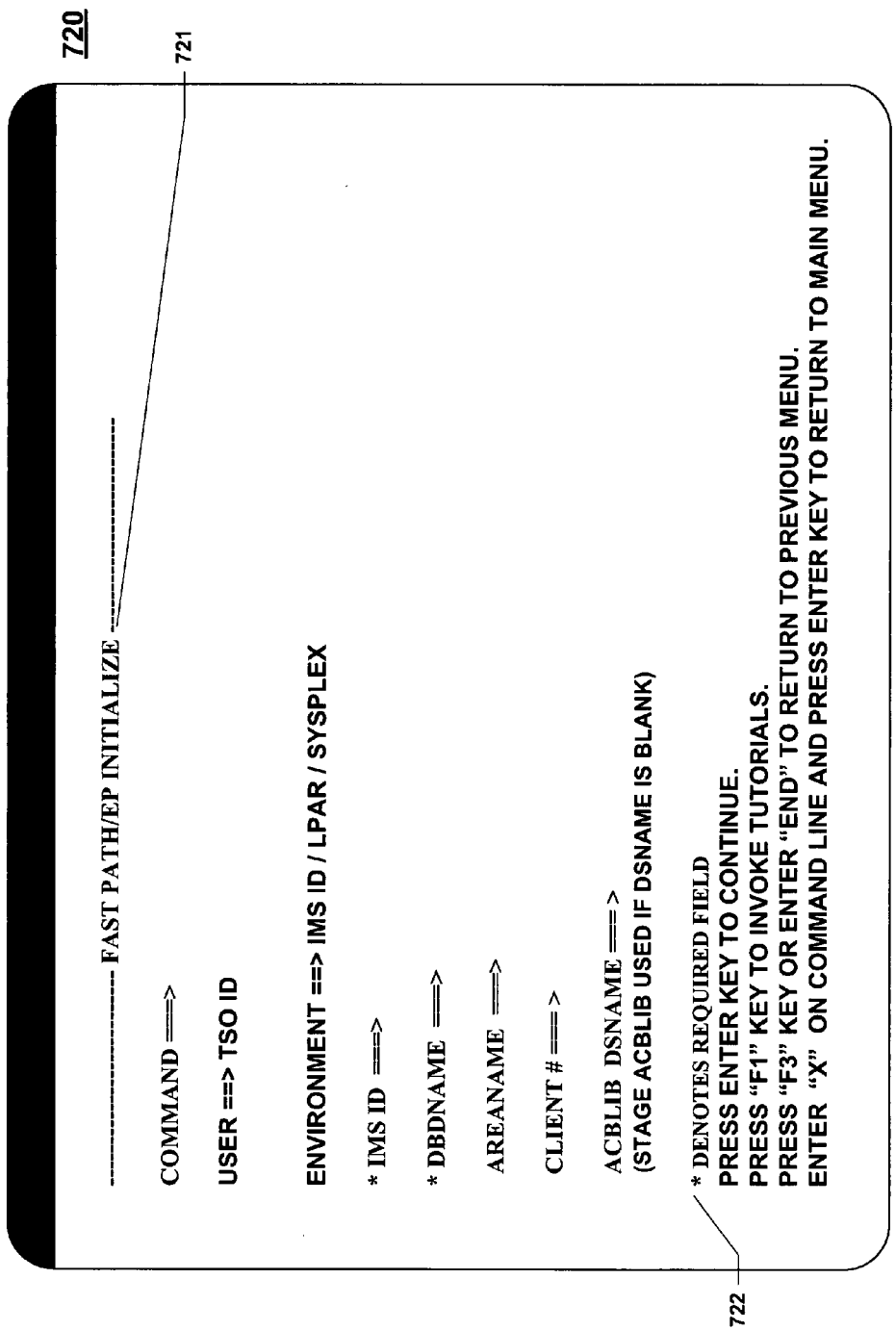
FIG. 7b presents a screen image depicting an IMS utilities screen in accordance with an exemplary embodiment of the present invention.

FIG. 7b presents a screen image 720 depicting an IMS utilities screen in accordance with an exemplary embodiment of the present invention. Referring to FIG. 7b, at 721, the title indicates the utility name: "FAST PATH/EP INITIALIZE," the option depicted as selected in the screen image 710 in FIG. 7a. Item 722 illustrates exemplary instructions to a user. In this case, the user is informed that fields with an asterisk denote required fields, where the user must provide input data.

Figure 7C:
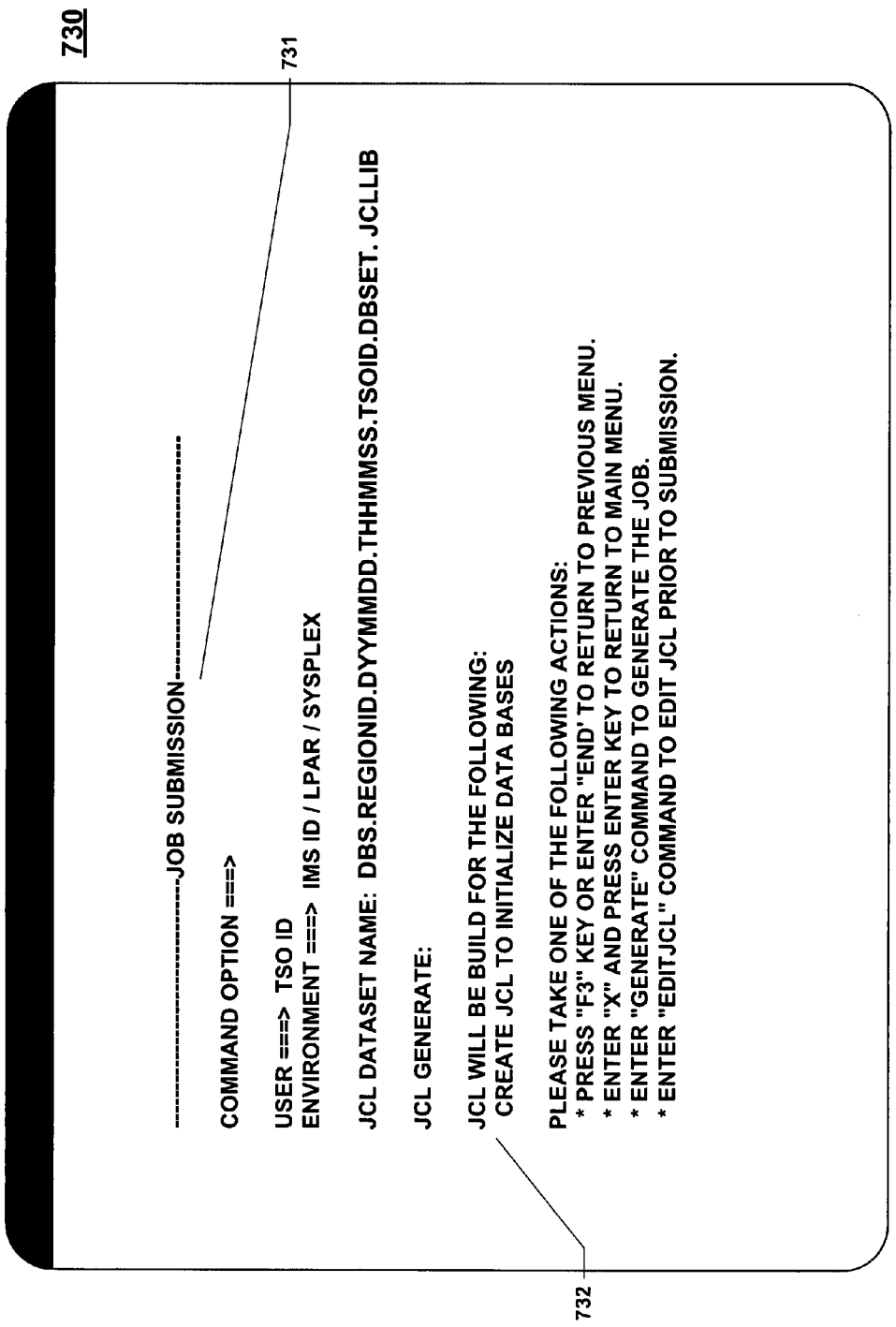
FIG. 7c presents a screen image depicting an IMS utilities screen in accordance with an exemplary embodiment of the present invention.

FIG. 7c presents a screen image 730 depicting an IMS utilities screen in accordance with an exemplary embodiment of the present invention. Referring to FIG. 7c, item 731 indicates that this screen relates to a job submission. As shown at item 732, the job will create the necessary JCL to initialize databases.

FIG. 8a presents a screen image 810 depicting a tutorial screen in accordance with an exemplary embodiment of the present invention. Referring to FIG. 8a, as discussed above in connection with FIG. 3, one exemplary subcategory is tutorials. In this exemplary embodiment, tutorials on 15 topics are offered, as indicated by items 811 and 812. In this case, as can be seen at item 813, topic "1" has been selected, "ADD-AREA."

Figure 8B:
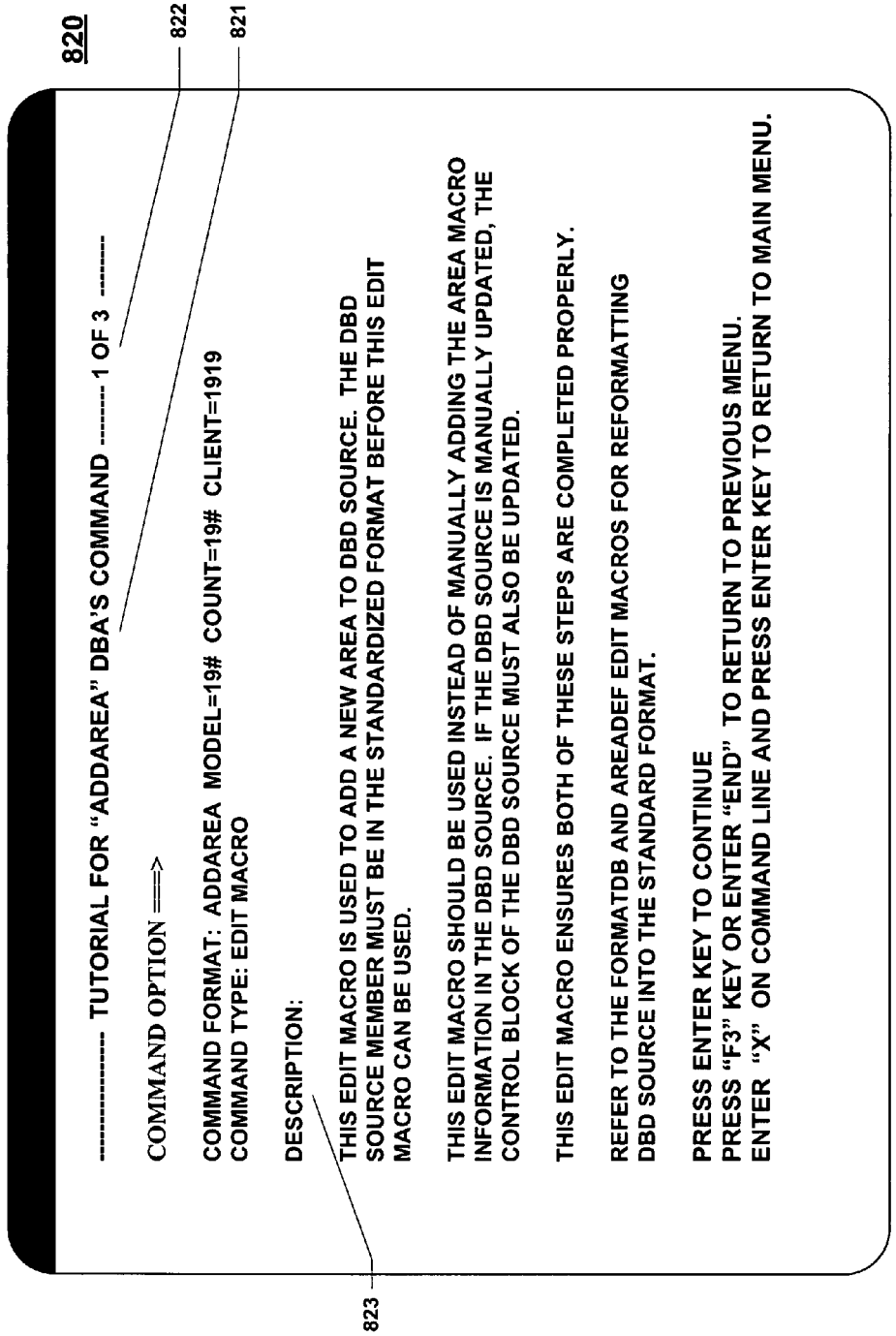
FIG. 8b presents a screen image depicting a tutorial screen in accordance with an exemplary embodiment of the present invention.

FIG. 8b presents a screen image 820 depicting a tutorial screen in accordance with an exemplary embodiment of the present invention. Referring to FIG. 8b, as can be seen from item 821, the screen title indicates that the screen provides a tutorial on the ADDAREA command. This option was selected in the screen image 820 depicted in FIG. 8a. Item 822 indicates that this screen is screen 1 of 3 screens that contain the tutorial information. Item 823 shows the start of the description of the ADDAREA command.

Figure 8C:
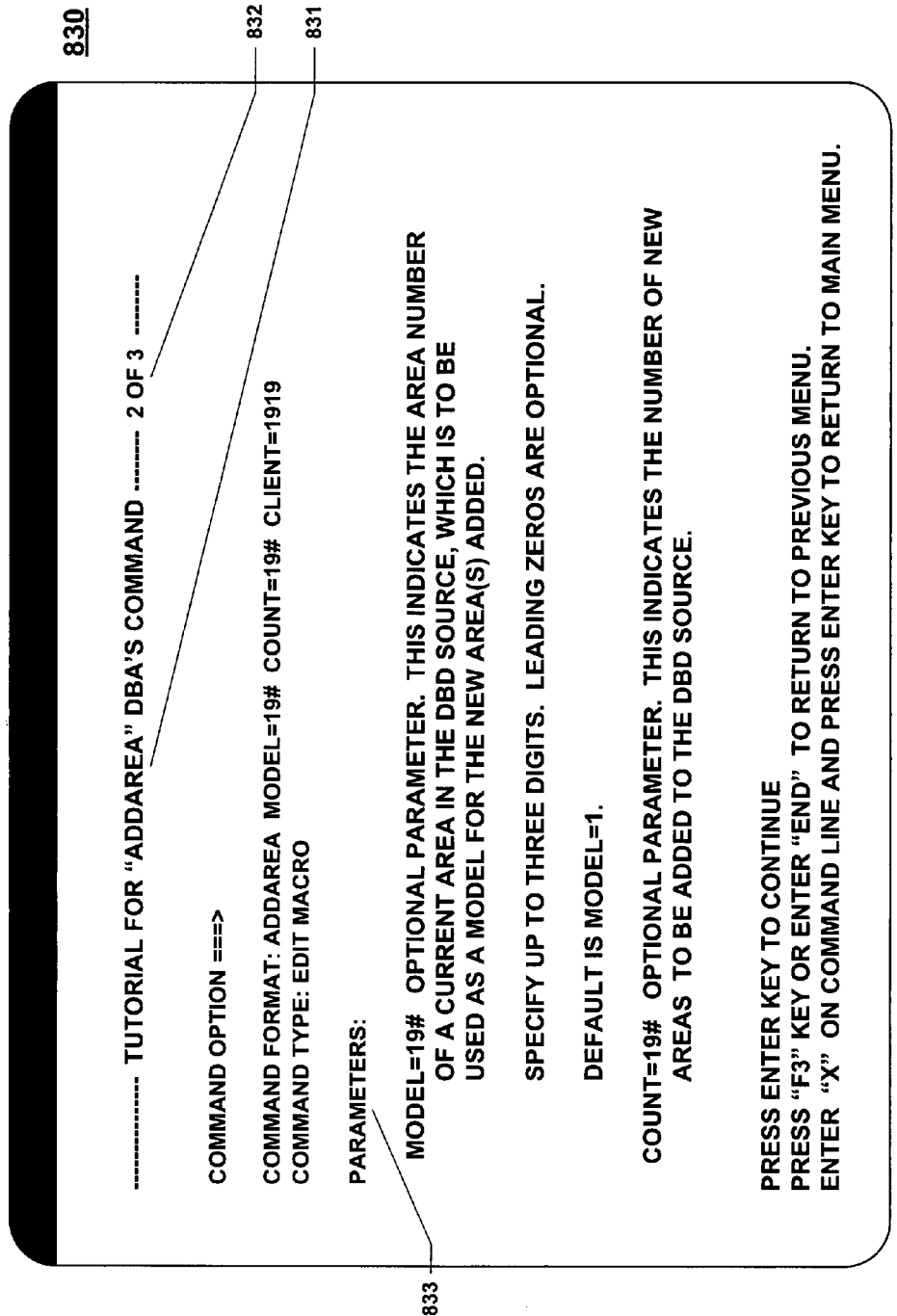
FIG. 8c presents a screen image depicting a tutorial screen in accordance with an exemplary embodiment of the present invention.

FIG. 8c presents a screen image 830 depicting a tutorial screen in accordance with an exemplary embodiment of the present invention. Referring to FIG. 8c, as can be seen from item 831, the screen title indicates that the screen provides a tutorial on the ADDAREA command, as was also the case in the screen image 820 of FIG. 8b. Item 832 indicates that this screen is screen 2 of 3 screens that contain the tutorial information. Item 833 shows the start of the parameters description for the ADDAREA command, that is, the parameters that can be included with the command.

Figure 8D:
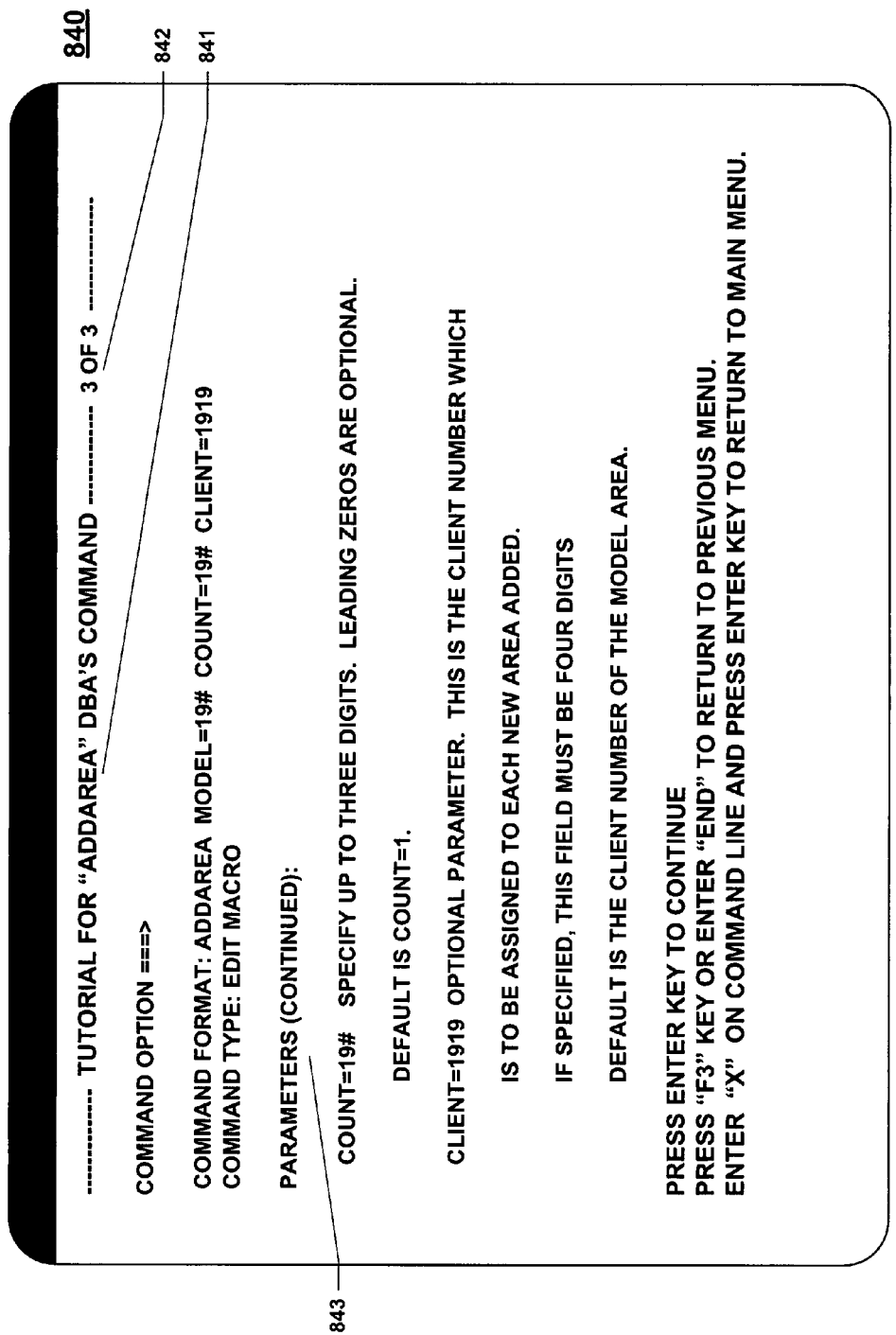
FIG. 8d presents a screen image depicting a tutorial screen in accordance with an exemplary embodiment of the present invention.

FIG. 8d presents a screen image 840 depicting a tutorial screen in accordance with an exemplary embodiment of the present invention. Referring to FIG. 8d, as can be seen from item 841, the screen title indicates that the screen provides a tutorial on the ADDAREA command, as was also the case in the screen image 820 of FIG. 8b and screen image 830 of FIG. 8c. Item 842 indicates that this screen is screen 3 of 3 screens that contain the tutorial information. Item 843 shows the continuation of the parameters description for the ADD-AREA command, that is, the parameters that can be included with the command.

One of ordinary skill in the art would appreciate that the screen images of FIGS. 6a-6g, 7a-7c, and 8a-8d are exemplary and relate to a specific set of database management tools (for an IMS data management system) resident on a specific computer platform (an IBM mainframe computer). They would appreciate that a similar structure could be implemented to cover a variety of database management systems and a variety of computer platforms. Although the structure would be similar, the content and implementation may be different without deviating from the present invention.

One of ordinary skill in the art would appreciate that the present invention supports systems and methods for providing database management tools through a centralized process. These tools may be either developed by a vendor of the database management system, a third party, or by the enterprise implementing the database management tools. The system would include an interface between the user and the system that allows the user to indicate specific tasks to perform and provide a means for the user to receive and input information. The interface may support the development of specific job control messages that can be executed to implement a chosen task.

What is claimed:

1. A system for providing database management system tools comprising:
   a database system resident on one or more computer platforms of an enterprise,
   a plurality of database management tools operable to that manipulates data contained in the database system, wherein the database management tools comprise at least one tool developed specifically for the database system, the enterprise and a job control library, wherein the job control library comprises scripts that provide instructions to an operating system of one of the computer platforms and wherein the job control library includes scripts written in Job Control Language; and
   a dialog management module, logically connected to the plurality of database management tools, the dialog management module providing a common interface for accessing and implementing the plurality of database management tools.

2. The system of claim 1 wherein the database system is an IBM IMS system.

3. A method for developing a centralized database management system for an enterprise comprising the steps of:
   identifying a first database management tool specific to a database management system;
   identifying a second database management tool specific to the database system and the enterprise, wherein the second database management tool comprises a tool developed for the enterprise based on a specific use of the database management system;
   developing a job control library; and
   developing an interface for each of the identified tools, wherein the interface provides a central access point to the first database management tool and the second database management tool.

4. The method of claim 3 further comprising the step of maintaining the identified database tools.

5. A system for accessing a plurality of database management system tools for a database system resident on one or more computer platforms of an enterprise comprising:
   a dialog management module, logically connected to the plurality of database management tools, and operable to provide the dialog management module providing a common interface for accessing and implementing the plurality of database management tools, wherein the database management tools comprise at least one tool developed specifically for the database system, the enterprise and a job control library to store computer instructions and accessible by the plurality of database management tool modules for generating a job control statement; and
   a plurality of database management tool modules operable to that generates a job control statement comprising computer instructions for implementing a database management task in response to receiving one or more data items from the dialog management module.

6. The system of claim 5 wherein the interface provided by the dialog management module is operable to receive the one or more data items.

* * * * *